(12) United States Patent
Lee et al.

(10) Patent No.: US 12,329,312 B2
(45) Date of Patent: Jun. 17, 2025

(54) PROCESS FOR MANUFACTURE OF NON-STICK PANS AND NON-STICK PAN

(71) Applicant: Jiangmen Yishan Metal Products Co., ltd., Guangdong (CN)

(72) Inventors: Changho Lee, Guangdong (CN); Wonyoung Lee, Guangdong (CN)

(73) Assignee: Jiangmen Yishan Metal Products Co., ltd., Guangdong (CN)

( * ) Notice: Subject to any disclaimer, the term of this patent is extended or adjusted under 35 U.S.C. 154(b) by 30 days.

(21) Appl. No.: 18/409,937

(22) Filed: Jan. 11, 2024

(65) Prior Publication Data
US 2025/0160564 A1    May 22, 2025

(30) Foreign Application Priority Data
Nov. 22, 2023    (CN) .......................... 202311561619.5

(51) Int. Cl.
*A47J 36/02*    (2006.01)
*B05D 5/08*    (2006.01)
(52) U.S. Cl.
CPC ............ *A47J 36/025* (2013.01); *B05D 5/083* (2013.01)

(58) Field of Classification Search
CPC .............................. A47J 36/025; B05D 5/083
See application file for complete search history.

(56) References Cited

U.S. PATENT DOCUMENTS

2007/0218297 A1\* 9/2007 Jeon ..................... B82Y 40/00
427/407.1
2020/0345168 A1\* 11/2020 Lee ........................ B05D 5/08

\* cited by examiner

*Primary Examiner* — James M Mellott
(74) *Attorney, Agent, or Firm* — Alix, Yale & Ristas, LLP

(57) ABSTRACT

A process for manufacture of non-stick pans and a non-stick pan. The process includes steps of screen-printing ink in a predetermined pattern on a surface of a pan body blank, carrying out an etching treatment on areas not covered by the ink on the surface the pan body blank by an etching process, to form concave and convex patterns on the surface of the pan body blank, carrying out a spraying treatment of a bottom-oil non-stick coating on the pan body blank after preheating the pan body blank, carrying out a polishing treatment on areas of the convex patterns on the surface of the pan body blank, carrying out a humidifying treatment on the surface of the pan body blank after preheating the pan body blank, and carrying out a spraying treatment of a surface-oil non-stick coating on the surface of the pan body blank.

9 Claims, 1 Drawing Sheet

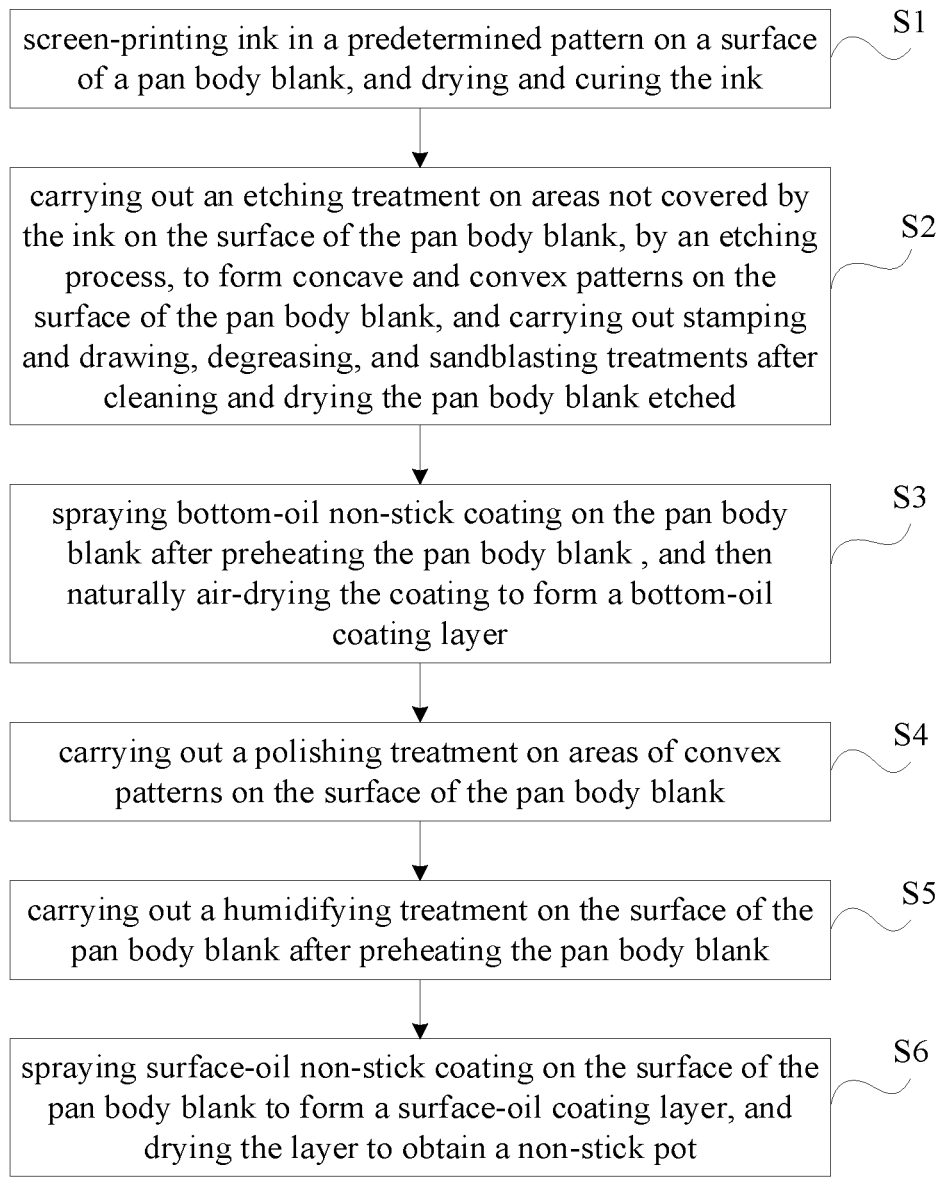

PROCESS FOR MANUFACTURE OF NON-STICK PANS AND NON-STICK PAN

CROSS-REFERENCE TO RELATED APPLICATIONS

The present application claims to the benefit of and priority to Chinese Patent Application No. 202311561619.5, filed Nov. 22, 2023, the entire disclosures of which are incorporated herein by reference.

TECHNICAL FIELD

The present disclosure relates to the technical field of kitchen wares, and particularly, to a process for manufacture of non-stick pans and a non-stick pan.

BACKGROUND

At present, commercially available non-stick pans will be scratched, smudged and blackened after long-term use, bringing troubles in cleaning and greatly reducing their non-stick performance. Therefore, a non-stick pan with concave and convex patterns has been introduced in the market, of which design increases a heat absorption area of the product and realizes the fast heat transfer and long service life of the product, and achieves the purpose of convenient cleaning at the same time.

However, at present, a non-stick coating spraying process of the non-stick pan with concave and convex patterns includes: spraying a bottom-oil non-stick coating directly on a pan body blank, then sending the pan body blank into a dryer for a drying treatment, then polishing a raised pattern position with sandpaper, so that the raised pattern position is not protected by a non-stick pan coating layer, and finally spraying a surface-oil non-stick coating on the pan body blank. Because a bottom-oil coating layer is protected by a complete surface-oil coating layer, a lasting full-screen non-stick effect is realized. However, because the bottom-oil non-stick coating is dried in an initial stage, the bottom-oil non-stick coating is hardened, which not only increases the difficulty of subsequent polishing process, but also reduces the adhesion between the surface-oil non-stick coating and the bottom-oil non-stick coating after spraying, so that the non-stick pan coating layer in the raised pattern position is still prone to fall off during long-term use, and the wear resistance is also worse. Moreover, the impact resistance of the non-stick coating layer on the surface of the existing non-stick pan also needs to be improved.

Therefore, there is a need for a new manufacture process for the non-stick pans, providing a non-stick coating layer on the surface of the non-stick pan produced by the process, which has good adhesion and wear resistance, as well as good impact resistance.

SUMMARY

The present disclosure aims to solve at least one of the technical problems of the existing technologies described above. Therefore, the present disclosure provides a process for manufacture of on-stick pans and a non-stick pan. According to the process of the present disclosure, a non-stick coating layer is prepared on a surface of the non-stick pan and has good adhesion and wear resistance, and further has good impact resistance, thus greatly improving a use effect and a service life of the non-stick pan.

The inventive concept of the present disclosure could be summarized as: a special bottom-oil non-stick coating is used together with a special surface-oil non-stick coating to jointly construct a non-stick pan coating layer with an excellent performance. The bottom-oil non-stick coating is coated and then naturally air-dried according to the manufacture process in the present disclosure, which effectively prevents the bottom-oil non-stick coating from being hardened compared with a drying treatment in a dryer in the prior art, thus reducing a difficulty of subsequent polishing process. In addition, a humidifying treatment is carried out on a surface of a pan body blank before the surface-oil non-stick coating is coated, which softens a coating layer of the bottom-oil non-stick coating, thus facilitating the combination with the subsequent surface-oil non-stick coating. This treatment effectively solves the problem that the non-stick pan coating layer falls off during long-term use, thus greatly improving a non-stick performance, a service life and an aesthetic degree of a pan body.

In the present disclosure, the bottom-oil non-stick coating is prepared by mixing water, glycerol, nano silicon, nano iron oxide, polytetrafluoroethylene, a silane coupling agent, sodium dodecyl benzene sulfonate, polydimethylsiloxane and diisopropyl peroxydicarbonate, the surface-oil non-stick coating is prepared by mixing water, nano carbon powder, nano silicon dioxide, a silane coupling agent, sodium dodecyl benzene sulfonate, polyethylene glycol, polytetrafluoroethylene, polydimethylsiloxane and diisopropyl peroxydicarbonate, and a bottom-oil coating layer and a surface-oil coating layer formed both contain iron and silicon elements, and both modify specific organic and specific inorganic components with the silane coupling agent, so that a compatibility of various components is improved, and wear resistance and impact resistance of the surface-oil coating layer are further improved.

In a first aspect, the present disclosure provides a process for manufacture of non-stick pans.

In detail, the process for manufacture of non-stick pans may include the following steps of:
- S1: screen-printing ink in a predetermined pattern on a surface of a pan body blank, and then drying and curing the ink;
- S2: carrying out an etching treatment on areas not covered by the ink on the surface of the pan body blank, by an etching process, to form concave and convex patterns on the surface of the pan body blank, and carrying out stamping and drawing, degreasing, and sandblasting treatments after cleaning and drying the pan body blank etched;
- S3: spraying bottom-oil non-stick coating on the pan body blank after preheating the pan body blank, and then naturally air-drying the coating to form a bottom-oil coating layer;
- S4: carrying out a polishing treatment on areas of convex patterns on the surface of the pan body blank;
- S5: carrying out a humidifying treatment on the surface of the pan body blank after preheating the pan body blank; and
- S6: spraying surface-oil non-stick coating on the surface of the pan body blank to form a surface-oil coating layer, and drying the layer to obtain a non-stick pot.

A preparation process of the bottom-oil non-stick coating includes: mixing water, glycerol, nano silicon, nano iron oxide, polytetrafluoroethylene, a silane coupling agent, sodium dodecyl benzene sulfonate, polydimethylsiloxane and diisopropyl peroxydicarbonate to form the bottom-oil non-stick coating; and A preparation process of the surface-oil non-stick coating includes: mixing water, nano carbon powder, nano silicon dioxide, a silane coupling agent, sodium dodecyl benzene sulfonate, polyethylene glycol, polytetrafluoroethylene, polydimethylsiloxane and diisopropyl peroxydicarbonate to form the surface-oil non-stick coating.

In some embodiments, the preparation process of the bottom-oil non-stick coating includes: stirring and mixing 40 parts to 60 parts of water, 5 parts to 10 parts of glycerol, 0.5 part to 2 parts of nano silicon, 0.5 part to 3 parts of nano iron oxide, 5 parts to 15 parts of polytetrafluoroethylene, 1 part to 8 parts of silane coupling agent, 1 part to 8 parts of sodium dodecyl benzene sulfonate, 1 part to 3 parts of polydimethylsiloxane, and 1 part to parts of diisopropyl peroxydicarbonate, according to parts by weight, to form the bottom-oil non-stick coating.

In some embodiments, the preparation process of the bottom-oil non-stick coating includes: stirring and mixing 45 parts to 55 parts of water, 6 parts to 10 parts of glycerol, 1.1 parts to 1.8 parts of nano silicon, 1.5 parts to 2 parts of nano iron oxide, 5 parts to 15 parts of polytetrafluoroethylene, 2 parts to 8 parts of silane coupling agent, 1 part to 5 parts of sodium dodecyl benzene sulfonate, 1 part to 3 parts of polydimethylsiloxane, and 1 part to 5 parts of diisopropyl peroxydicarbonate, according to parts by weight, to form the bottom-oil non-stick coating.

In some embodiments, the preparation process of the surface-oil non-stick coating includes: stirring and mixing 30 parts to 50 parts of water, 0.8 part to 3 parts of nano carbon powder, 2 parts to 8 parts of nano silicon dioxide, 2 parts to 8 parts of silane coupling agent, 2 parts to 12 parts polyethylene glycol, 5 parts to 15 parts of polytetrafluoroethylene, 1 part to 3 parts of polydimethylsiloxane, and 1 part to 5 parts of diisopropyl peroxydicarbonate, according to parts by weight, to form the surface-oil non-stick coating.

In some embodiments, the preparation process of the surface-oil non-stick coating includes: stirring and mixing 35 parts to 45 parts of water, 0.8 part to 1.8 parts of nano carbon powder, 2 parts to 5 parts of nano silicon dioxide, 2 parts to 6 parts of silane coupling agent, 4 parts to 12 parts polyethylene glycol, 5 parts to 15 parts of polytetrafluoroethylene, 1 part to 3 parts of polydimethylsiloxane, and 1 part to 5 parts of diisopropyl peroxydicarbonate, according to parts by weight, to form the surface-oil non-stick coating.

In some embodiments, the surface-oil non-stick coating further contains 0.1 part to 0.3 part of graphene oxide. The added graphene oxide interacts with other components in the surface-oil non-stick coating to further improve the wear resistance of the coating layer.

In some embodiments, the stirring is carried out at a speed of 1,000 rpm to 3,000 rpm, and the stirring lasts for 10 minutes to 30 minutes; and preferably, the stirring is carried out at a speed of 1,500 rpm to 2,500 rpm, and the stirring lasts for 10 minutes to 30 minutes.

In some embodiments, the stirring is carried out at a temperature of 25° C. to 35° C., and preferably 28° C. to 35° C.

In some embodiments, the bottom-oil non-stick coating further includes pigment for forming various required colors of the non-stick layer, thus further improving the aesthetic of the product.

In some embodiments, in the step S1, the pan body blank is made of steel, and preferably a three-layer steel composite plane blank consisting of an outer layer and an inner layer which are made of stainless steel, and a middle layer formed by composition of aluminum alloy. Because the aluminum alloy of the middle layer realizes quick heat conduction and even heating, heat is evenly transferred to the stainless steel of the inner layer, and because food can be evenly heated during cooking, a smokeless effect is realized.

In some embodiments, in the step S1, the predetermined pattern described is a polygonal pattern with even matrix distribution, such as a square, a hexagon and other honeycomb patterns.

In some embodiments, in the step S2, the etching treatment has an etching depth of 0.1 mm to 0.3 mm, allowing a plurality of independent or non-independent oil grooves are distributed on an inner surface of a pan body, so that when cooking oil in the pan is heated, oils stored in these oil grooves are heated to boiling, and food floats slightly after being supported by these dispersed boiling oils, and because the food is not in direct contact with a bottom of the pan, the effect of effectively preventing food sticking on the pan is realized. In the step S2, the stamping and drawing is used to form a required shape of the pan body, and is a common operation in the art.

In some embodiments, in the step S2, the degreasing refers to sintering residual grease of the pan body blank in a high-temperature furnace at a temperature of 150° C. to 450° C., and is also beneficial for removing dirt left by drawing the surface of the pan body blank.

In some embodiments, in the step S2, the sandblasting treatment has a thickness of 0.3 μm to 4.5 μm; the treatment mainly refers to carrying out a high-pressure sandblasting treatment on the inner surface of the pan body blank, and a material used in the sandblasting treatment is one or more of quartz sand, brown fused alumina, river sand, glass beads and steel balls; a particle size of the material used is 38 meshes to 180 meshes; and this process mainly improves fatigue resistance of the blank, increases adhesion between the blank and the coating layer, prolongs durability of a coating film, and is also beneficial for leveling and decoration of the coating.

In some embodiments, in the step S3, the preheating treatment is carried out at a temperature of 30° C. to 150° C., and the treatment lasts for 3 minutes to 30 minutes. The preheating treatment is carried out at a temperature of 90° C. to 100° C., and the treatment lasts for 12 minutes to 15 minutes.

In some embodiments, in the step S3, a thickness of the bottom-oil coating layer formed by the spraying treatment of the bottom-oil non-stick coating is 12 μm to 35 km; preferably, 15 μm to 30 μm; and more preferably, 18 μm to 20 km.

In some embodiments, in the step S3, the natural air-drying used effectively prevents the bottom-oil non-stick coating from being hardened compared with the drying treatment in the dryer in the prior art, thus reducing the difficulty of subsequent polishing process.

In some embodiments, in the step S4, the position of the convex pattern on the surface of the pan body blank is subjected to the polishing treatment with sandpaper of 80 meshes to 320 meshes, so that no bottom-oil coating layer is arranged in the position of the convex pattern, which highlights the decorative effect of the position of the convex pattern. In another embodiment, the position of the convex pattern is subjected to the polishing treatment with sandpaper of 200 meshes to 250 meshes. Because the natural air-drying is used, the bottom-oil coating layer is not hardened, so that the polishing treatment is easier and a polishing effect is more thorough.

In some embodiments, in the step S5, the humidifying treatment is carried out on the surface of the pan body blank, so that a humidity of the surface of the pan body blank reaches 85% to 95%; and preferably, 85% to 90%. The humidifying treatment softens the bottom-oil coating layer, thus facilitating the combination with the subsequent surface-oil non-stick coating.

In some embodiments, in the step S6, a thickness of the surface-oil coating layer formed by the spraying treatment of the surface-oil non-stick coating is 12 μm to 35 μm; preferably, 15 μm to 30 μm; and more preferably, 18 μm to 20 μm. This treatment allows the concave and convex patterns of the whole pan body blank product to both be protected by the non-stick coating, thus improving a non-stick performance of the product.

In some embodiments, in the step S6, the drying is carried out at a temperature of 40° C. to 100° C., and the drying lasts for 10 minutes to 30 minutes; and, the drying is carried out at a temperature of 70° C. to 75° C., and the drying lasts for 15 minutes to 20 minutes. This step mainly strengthens the combination of the surface-oil non-stick coating and the bottom-oil non-stick coating, thus solving the problem that the non-stick pan coating falls off during long-term use.

In a second aspect, the present disclosure provides a non-stick pan.

The non-stick pan is prepared by the manufacture method above.

Compared with the existing technology, the present disclosure has the following beneficial effects:

(1) The special bottom-oil non-stick coating is used together with the special surface-oil non-stick coating in the present disclosure to jointly construct the non-stick pan coating layer with an excellent performance. The bottom-oil non-stick coating is coated and then naturally air-dried according to the manufacturing process in the present disclosure, which effectively prevents the bottom-oil non-stick coating from being hardened compared with the drying treatment in the dryer in the prior art, thus reducing the difficulty of subsequent polishing process. In addition, the humidifying treatment is carried out on the surface of the pan body blank before the surface-oil non-stick coating is coated, which softens the coating layer of the bottom-oil non-stick coating, thus facilitating the combination with the subsequent surface-oil non-stick coating. This treatment effectively solves the problem that the non-stick pan coating layer falls off during long-term use, thus greatly improving a non-stick performance, a service life and an aesthetic degree of a pan body.

(2) In the present disclosure, the bottom-oil non-stick coating is prepared by mixing water, glycerol, nano silicon, nano iron oxide, polytetrafluoroethylene, a silane coupling agent, sodium dodecyl benzene sulfonate, polydimethylsiloxane and diisopropyl peroxydicarbonate, the surface-oil non-stick coating is prepared by mixing water, nano carbon powder, nano silicon dioxide, a silane coupling agent, sodium dodecyl benzene sulfonate, polyethylene glycol, polytetrafluoroethylene, polydimethylsiloxane and diisopropyl peroxydicarbonate, and a bottom-oil coating layer and a surface-oil coating layer formed both contain iron and silicon elements, and both modify specific organic and specific inorganic components with the silane coupling agent, so that a compatibility of various components is improved, and wear resistance and impact resistance of the surface-oil coating layer are further improved.

(3) The surface-oil non-stick coating further contains 0.1 part to 0.3 part of graphene oxide. The added graphene oxide interacts with other components in the surface-oil non-stick coating to further improve the wear resistance of the coating layer.

BRIEF DESCRIPTION OF DRAWINGS

FIG. 1 is a flowchart of a process for manufacture of non-stick pans according to an embodiment of the present disclosure.

DETAILED DESCRIPTION

In order to help those skilled in the art better understand the technical solutions of the present disclosure, the following embodiments are now provided for description. It should be pointed out that the following embodiments do not limit the scope of protection claimed by the present disclosure.

Unless otherwise specified, the raw materials, reagents or devices used in the following embodiments may all be obtained in conventional commercial ways, or obtained by existing known methods.

Referring to the FIGURE, some embodiments are described in detail below.

Embodiment 1

A process or manufacture of non-stick pans included the following steps.

In S1, ink was screen-printed in a predetermined pattern (a hexagonal honeycomb pattern) on a surface of a pan body blank (a three-layer steel composite plane blank consisting of an outer layer and an inner layer which were made of stainless steel, and a middle layer formed by composition of aluminum alloy), and then dried and cured (this step belonged to a conventional process in the art).

In S2, an etching treatment (an etching depth was 0.2±0.1 mm, and the etching treatment belonged to a conventional process in the art) was carried out on areas not covered by the ink on the surface the pan body blank in the S1 by an etching process, so that concave and convex patterns were formed on the surface of the pan body blank, and the pan body blank was cleaned and dried, and then subjected to stamping and drawing, degreasing (the degreasing was carried out at 350° C.), and a sandblasting treatment (a thickness of the sandblasting treatment was 0.35 μm; and a material used in the sandblasting treatment was quartz sand, with a particle size of 150 meshes).

In S3, a preheating treatment (the preheating treatment was carried out at 60° C., and the treatment lasted for 8 minutes) was carried out on the pan body blank treated in the step S2, a spraying treatment of a bottom-oil non-stick coating was carried out on the pan body blank, and then the coating was naturally air-dried to form a bottom-oil coating layer. A thickness of the bottom-oil coating layer was 20 μm.

In S4, a polishing treatment (the polishing treatment was carried out with sandpaper of 250 meshes) was carried out on the areas of the convex pattern on the surface of the pan body blank treated in the step S3, so that no bottom-oil coating layer was arranged on the areas of the convex patterns.

In S5, the pan body blank treated in the step S4 was preheated, and then a humidifying treatment was carried out on the surface of the pan body blank (the preheating was carried out at 40° C., so that a humidity of the surface of the pan body blank was 90%).

In S6, a spraying treatment of a surface-oil non-stick coating was carried out on the surface of the pan body blank treated in the step S5 to form a surface-oil coating layer, where a thickness of the surface-oil coating layer was 20 m, and the layer was dried at 75° C. for 20 minutes to obtain the non-stick pot.

A preparation process of the bottom-oil non-stick coating included: stirring and mixing 45 parts of water, 6 parts of glycerol, 1 part of nano silicon, 1.2 parts of nano iron oxide, 10 parts of polytetrafluoroethylene, 3 parts of silane coupling agent KH560, 1.5 parts of sodium dodecyl benzene sulfonate, 1 part of polydimethylsiloxane and 2 parts of diisopropyl peroxydicarbonate at a stirring speed of 1,800 rpm for 15 minutes, according to parts by weight, to form the bottom-oil non-stick coating.

A preparation process of the surface-oil non-stick coating included: stirring and mixing 40 parts of water, 1.2 parts of nano carbon powder, 2.1 parts of nano silicon dioxide, parts of silane coupling agent KH560, 6 parts polyethylene glycol, 8 parts of polytetrafluoroethylene, 1.5 parts of polydimethylsiloxane and 2 parts of diisopropyl peroxydicarbonate at a stirring speed of 2,000 rpm for 15 minutes, according to parts by weight, to form the surface-oil non-stick coating.

Embodiment 2

A process for manufacture of non-stick pans included the following steps.

In S1, ink was screen-printed in a predetermined pattern (a quadrangle pattern) on a surface of a pan body blank (a three-layer steel composite plane blank consisting of an outer layer and an inner layer which were made of stainless steel, and a middle layer formed by composition of aluminum alloy), and then dried and cured (this step belonged to a conventional process in the art).

In S2, an etching treatment (an etching depth was 0.1±0.1 mm, and the etching treatment belonged to a conventional process in the art) was carried out on areas not covered by the ink on the surface the pan body blank in the S1 by an etching process, so that concave and convex patterns were formed on the surface of the pan body blank, and the pan body blank was cleaned and dried, and then subjected to stamping and drawing, degreasing (the degreasing was carried out at 380° C.), and a sandblasting treatment (a thickness of the sandblasting treatment was 0.30 μm; and a material used in the sandblasting treatment was quartz sand, with a particle size of 150 meshes).

In S3, a preheating treatment (the preheating treatment was carried out at 70° C., and the treatment lasted for 10 minutes) was carried out on the pan body blank treated in the step S2, a spraying treatment of a bottom-oil non-stick coating was carried out on the pan body blank, and then the coating was naturally air-dried to form a bottom-oil coating layer. A thickness of the bottom-oil coating layer was 20 μm.

In S4, a polishing treatment (the polishing treatment was carried out with sandpaper of 250 meshes) was carried out on the areas of the convex patterns on the surface of the pan body blank treated in the step S3, so that no bottom-oil coating layer was arranged on the areas of the convex patterns.

In S5, the pan body blank treated in the step S4 was preheated, and then a humidifying treatment was carried out on the surface of the pan body blank (the preheating was carried out at 50° C., so that a humidity of the surface of the pan body blank was 95%).

In S6, a spraying treatment of a surface-oil non-stick coating was carried out on the surface of the pan body blank treated in the step S5 to form a surface-oil coating layer, where a thickness of the surface-oil coating layer was 18 m, and the layer was dried at 75° C. for 20 minutes to obtain the non-stick pot.

A preparation process of the bottom-oil non-stick coating included: stirring and mixing 45 parts of water, 5 parts of glycerol, 1.2 part of nano silicon, 1.5 parts of nano iron oxide, 9 parts of polytetrafluoroethylene, 2.5 parts of silane coupling agent KH560, 1.8 parts of sodium dodecyl benzene sulfonate, 1.2 part of polydimethylsiloxane and 2 parts of diisopropyl peroxydicarbonate at a stirring speed of 2000 rpm for 12 minutes, according to parts by weight, to form the bottom-oil non-stick coating.

A preparation process of the surface-oil non-stick coating included: stirring and mixing 45 parts of water, 1.4 parts of nano carbon powder, 2.3 parts of nano silicon dioxide, 5.2 parts of silane coupling agent KH560, 6.5 parts polyethylene glycol, 8.5 parts of polytetrafluoroethylene, 1.6 parts of polydimethylsiloxane and 2.1 parts of diisopropyl peroxydicarbonate at a stirring speed of 2,200 rpm for 12 minutes according to parts by weight, to form the surface-oil non-stick coating.

Embodiment 3

A process for manufacture of non-stick pans included the following steps.

In S1, ink was screen-printed in a predetermined pattern (a hexagonal honeycomb pattern) on a surface of a pan body blank (a three-layer steel composite plane blank consisting of an outer layer and an inner layer which were made of stainless steel, and a middle layer formed by composition of aluminum alloy), and then dried and cured (this step belonged to a conventional process in the art).

In S2, an etching treatment (an etching depth was 0.2±0.1 mm, and the etching treatment belonged to a conventional process in the art) was carried out on areas not covered by the ink on the surface the pan body blank in the S1 by an etching process, so that concave and convex patterns were formed on the surface of the pan body blank, and the pan body blank was cleaned and dried, and then subjected to stamping and drawing, degreasing (the degreasing was carried out at 350° C.), and a sandblasting treatment (a thickness of the sandblasting treatment was 0.35 μm; and a material used in the sandblasting treatment was brown fused alumina, with a particle size of 150 meshes).

In S3, a preheating treatment (the preheating treatment was carried out at 60° C., and the treatment lasted for 8 minutes) was carried out on the pan body blank treated in the step S2, a spraying treatment of a bottom-oil non-stick coating was carried out on the pan body blank, and then the coating was naturally air-dried to form a bottom-oil coating layer. A thickness of the bottom-oil coating layer was 20 μm.

In S4, a polishing treatment (the polishing treatment was carried out with sandpaper of 250 meshes) was carried out on the areas of the convex patterns on the surface of the pan body blank treated in the step S3, so that no bottom-oil coating layer was arranged the areas of the convex patterns.

In S5, the pan body blank treated in the step S4 was preheated, and then a humidifying treatment was carried out on the surface of the pan body blank (the preheating was carried out at 40° C., so that a humidity of the surface of the pan body blank was 90%).

In S6, a spraying treatment of a surface-oil non-stick coating was carried out on the surface of the pan body blank treated in the step S5 to form a surface-oil coating layer, where a thickness of the surface-oil coating layer was 20 m, and the layer was dried at 75° C. for 20 minutes to obtain the non-stick pot.

A preparation process of the bottom-oil non-stick coating included: stirring and mixing 40 parts of water, 5 parts of glycerol, 0.8 part of nano silicon, 1.6 parts of nano iron oxide, 11 parts of polytetrafluoroethylene, 3.5 parts of silane coupling agent KH560, 1.8 parts of sodium dodecyl benzene sulfonate, 1 part of polydimethylsiloxane and 2.5 parts of diisopropyl peroxydicarbonate at a stirring speed of 1,800 rpm for 15 minutes, according to parts by weight, to form the bottom-oil non-stick coating.

A preparation process of the surface-oil non-stick coating included: stirring and mixing 40 parts of water, 1.6 parts of nano carbon powder, 2.5 parts of nano silicon dioxide, 5.5 parts of silane coupling agent KH560, 7 parts polyethylene glycol, 8.5 parts of polytetrafluoroethylene, 1.5 parts of polydimethylsiloxane and 2.5 parts of diisopropyl peroxydicarbonate at a stirring speed of 2,000 rpm for 15 minutes according to parts by weight, to form the surface-oil non-stick coating.

Embodiment 4

A process for manufacture of non-stick pans included the following steps.

In S1, ink was screen-printed in a predetermined pattern (a hexagonal honeycomb pattern) on a surface of a pan body blank (a three-layer steel composite plane blank consisting of an outer layer and an inner layer which were made of stainless steel, and a middle layer formed by composition of aluminum alloy), and then dried and cured (this step belonged to a conventional process in the art).

In S2, an etching treatment (an etching depth was 0.2±0.1 mm, and the etching treatment belonged to a conventional process in the art) was carried out on areas not covered by the ink on the surface the pan body blank in the S1 by an etching process, so that concave and convex patterns were formed on the surface of the pan body blank, and the pan body blank was cleaned and dried, and then subjected to stamping and drawing, degreasing (the degreasing was carried out at 350° C.), and a sandblasting treatment (a thickness of the sandblasting treatment was 0.35 μm; and a material used in the sandblasting treatment was quartz sand, with a particle size of 150 meshes).

In S3, a preheating treatment (the preheating treatment was carried out at 60° C., and the treatment lasted for 8 minutes) was carried out on the pan body blank treated in the step S2, a spraying treatment of a bottom-oil non-stick coating was carried out on the pan body blank, and then the coating was naturally air-dried to form a bottom-oil coating layer. A thickness of the bottom-oil coating layer was 20 μm.

In S4, a polishing treatment (the polishing treatment was carried out with sandpaper of 250 meshes) was carried out on areas of the convex patterns on the surface of the pan body blank treated in the step S3, so that no bottom-oil coating layer was arranged on the areas of the convex patterns.

In S5, the pan body blank treated in the step S4 was preheated, and then a humidifying treatment was carried out on the surface of the pan body blank (the preheating was carried out at 50° C., so that a humidity of the surface of the pan body blank was 90%).

In S6, a spraying treatment of a surface-oil non-stick coating was carried out on the surface of the pan body blank treated in the step S5 to form a surface-oil coating layer, where a thickness of the surface-oil coating layer was 20 m, and the layer was dried at 75° C. for 20 minutes to obtain the non-stick pot.

A preparation process of the bottom-oil non-stick coating included: stirring and mixing 45 parts of water, 6 parts of glycerol, 1 part of nano silicon, 1.2 parts of nano iron oxide, 10 parts of polytetrafluoroethylene, 3 parts of silane coupling agent KH560, 1.5 parts of sodium dodecyl benzene sulfonate, 1 part of polydimethylsiloxane and 2 parts of diisopropyl peroxydicarbonate at a stirring speed of 1,800 rpm for 15 minutes, according to parts by weight, to form the bottom-oil non-stick coating.

A preparation process of the surface-oil non-stick coating included: stirring and mixing 40 parts of water, 1.2 parts of nano carbon powder, 2.1 parts of nano silicon dioxide, parts of silane coupling agent KH560, 6 parts polyethylene glycol, 8 parts of polytetrafluoroethylene, 1.5 parts of polydimethylsiloxane, 2 parts of diisopropyl peroxydicarbonate and 0.15 part of graphene oxide at a stirring speed of 2,000 rpm for 15 minutes, according to parts by weight, to form the surface-oil non-stick coating.

Comparative Example 1

Compared with Embodiment 1, in Comparative Example 1, the same amount of nano iron oxide was used instead of the nano silicon in Embodiment 1 in the preparation process of the bottom-oil non-stick coating, and other components and processes were the same as those in Embodiment 1.

Comparative Example 2

Compared with Embodiment 1, in Comparative Example 2, the same amount of nano silicon dioxide was used instead of the nano carbon powder in Embodiment 1 in the preparation process of the surface-oil non-stick coating, and other components and processes were the same as those in Embodiment 1.

Comparative Example 3

Compared with Embodiment 1, in Comparative Example 3, the same amount of polyethylene glycol was used instead of the silane coupling agent KH560 in Embodiment 1 in the preparation processes of the bottom-oil non-stick coating and the surface-oil non-stick coating, and other components and processes were the same as those in Embodiment 1.

Comparative Example 4

Compared with Embodiment 1, drying at 60° C. in step S3 of Comparative Example 4 was used instead of natural air-drying, and other components and processes were the same as those in Embodiment 1.

Comparative Example 5

Compared with Embodiment 1, a humidifying treatment in step S5 of Comparative Example 5 was omitted, and other components and processes were the same as those in Embodiment 1.

Product Effect Test

The non-stick pans prepared in Embodiment 1, Embodiment 4 and Comparative Examples 1 to 5 were taken, and adhesion, wear resistance and impact resistance of coating layers formed on surfaces of the non-stick pans were tested, where the adhesion was tested according to the GB/T9286-

1998 standard; the wear resistance was tested according to the GB/T1768-1979 standard, after 200 rounds of grinding with a grinding wheel under a weight of 300 g, a weight loss of the coating layer was taken as an index of the wear resistance, and the smaller the weight loss, the better the wear resistance; and the impact resistance was tested according to the GB/T1732-93 standard. Specific results were shown in Table 1.

TABLE 1

| | Adhesion | Weight loss of coating layer (g) | Impact resistance (kg × cm) |
|---|---|---|---|
| Embodiment 1 | 0 level | 0.0008 | 290 |
| Embodiment 4 | 0 level | 0.0006 | 312 |
| Comparative Example 1 | 1 level | 0.0015 | 281 |
| Comparative Example 2 | 2 level | 0.0020 | 265 |
| Comparative Example 3 | 2 level | 0.0036 | 247 |
| Comparative Example 4 | 2 level | 0.0032 | 261 |
| Comparative Example 5 | 2 level | 0.0025 | 272 |

It can be seen from Table 1 that the coating layers on the surfaces of the non-stick pans prepared in the embodiments of the present disclosure have obviously better adhesion, wear resistance and impact resistance than those in Comparative Examples 1 to 3.

It can be seen from the results of Comparative Example 1 and Embodiment 1 that, when the same amount of nano iron oxide is used instead of nano silicon in the preparation process of the bottom-oil non-stick coating, although an influence on the adhesion of the coating layer is smaller, there are obvious adverse influences on the wear resistance and the impact resistance of the coating layer. The reason may be the lack of nano silicon, which can weaken combination strength between the bottom-oil coating layer and the surface-oil coating layer, thus being more prone to cause a loss of the surface-oil coating layer.

It can be seen from the results of Comparative Example 2 and Embodiment 1 that, when the nano carbon powder in the surface-oil non-stick coating interacts with other components (organic and inorganic substances), the adhesion, the wear resistance and the impact resistance can be significantly improved.

It can be seen from the results of Comparative Example 3 and Embodiment 1 that the silane coupling agent KH560 cannot be replaced by other common organic substances (polyethylene glycol), and the silane coupling agent KH560 plays a decisive role in the fusion of various components in the coating layer, so that great influences are generated on the adhesion, the wear resistance and the impact resistance of the coating layer.

It can be seen from the results of Comparative Examples 4 to 5 and Embodiment 1 that the natural air-drying and the humidifying treatment are obviously beneficial for improving the adhesion, the wear resistance and the impact resistance of the coating layer.

It can be seen from the results of Embodiment 1 and Embodiment 4 that the appropriate addition of graphene oxide can improve the wear resistance and the impact resistance of the coating layer.

To sum up, in the preparation processes of the bottom-oil non-stick coating and the surface-oil non-stick coating in the present disclosure, various components interact with each other, so that the adhesion, the wear resistance and the impact resistance of the coating layer are improved, and some components cannot be simply replaced.

Effects of other embodiments above are similar to that of Embodiment 1, which will not be repeated herein.

It should be pointed out that the above embodiments are only some embodiments of the present disclosure, and do not limit the scope of protection of the present disclosure. Within the scope of protection of the present disclosure, the effects similar to that of Embodiment 1 can be obtained by appropriately changing process parameters or component dosages.

The invention claimed is:

1. A process for manufacture of non-stick pans, comprising:
    screen-printing ink in a predetermined pattern on a surface of a pan body blank, and drying and curing the ink;
    carrying out an etching treatment on areas not covered by the ink on the surface of the pan body blank to form concave and convex patterns on the surface of the pan body blank, and carrying out stamping and drawing, degreasing, and sandblasting treatments after cleaning and drying the etched pan body blank;
    spraying a bottom-oil non-stick coating on the pan body blank after preheating the pan body blank, and then naturally air-drying the coating to form a bottom-oil coating layer;
    carrying out a polishing treatment on areas of convex patterns on the surface of the pan body blank;
    carrying out a humidifying treatment on the surface of the pan body blank after preheating the pan body blank; and
    spraying a surface-oil non-stick coating on the surface of the pan body blank to form a surface-oil coating layer, and drying the layer to obtain a non-stick pan;
    wherein,
    the bottom-oil non-stick coating is obtained by a preparation process comprising: mixing water, glycerol, nano silicon, nano iron oxide, polytetrafluoroethylene, a silane coupling agent, sodium dodecyl benzene sulfonate, polydimethylsiloxane and diisopropyl peroxydicarbonate; and
    the surface-oil non-stick coating is obtained by a preparation process comprising: mixing water, nano carbon powder, nano silicon dioxide, a silane coupling agent, sodium dodecyl benzene sulfonate, polyethylene glycol, polytetrafluoroethylene, polydimethylsiloxane and diisopropyl peroxydicarbonate.

2. The process according to claim 1, wherein, the preparation process of the bottom-oil non-stick coating includes: stirring and mixing 40 parts to 60 parts of water, 5 parts to parts of glycerol, 0.5 part to 2 parts of nano silicon, 0.5 part to 3 parts of nano iron oxide, parts to 15 parts of polytetrafluoroethylene, 1 part to 8 parts of silane coupling agent, 1 part to 8 parts of sodium dodecyl benzene sulfonate, 1 part to 3 parts of polydimethylsiloxane, and 1 part to 5 parts of diisopropyl peroxydicarbonate, according to parts by weight, to prepare the bottom-oil non-stick coating.

3. The process according to claim 1, wherein, the preparation process of the surface-oil non-stick coating includes: stirring and mixing 30 parts to 50 parts of water, 0.8 part to 3 parts of nano carbon powder, 2 parts to 8 parts of nano silicon dioxide, 2 parts to 8 parts of silane coupling agent, 2 parts to 12 parts polyethylene glycol, 5 parts to 15 parts of polytetrafluoroethylene, 1 part to 3 parts of polydimethylsiloxane, and 1 part to 5 parts of diisopropyl peroxydicarbonate, according to parts by weight, to prepare the surface-oil non-stick coating.

4. The process according to claim 1, wherein the surface-oil non-stick coating further contains 0.1 to 0.3 part by weight of graphene oxide.

5. The process according to claim 1, wherein the bottom-oil non-stick coating further includes pigment.

6. The process according to claim 1, wherein the bottom-oil coating layer has a thickness of 12 μm to 35 μm.

7. The process according to claim 1, wherein, the humidifying treatment is carried out on the surface of the pan body blank, rendering the pan body blank to have a humidity of 85% to 95% on the surface thereof.

8. The process according to claim 1, wherein the surface-oil coating layer has a thickness of 12 μm to 35 μm.

9. The process according to claim 1, wherein, the surface-oil non-stick coating is dried at a temperature of 40° C. to 100° C., and for 10 minutes to 30 minutes.

\* \* \* \* \*

UNITED STATES PATENT AND TRADEMARK OFFICE
CERTIFICATE OF CORRECTION

Page 1 of 1

PATENT NO. : 12,329,312 B2
APPLICATION NO. : 18/409937
DATED : June 17, 2025
INVENTOR(S) : Changho Lee and Wonyoung Lee It is certified that error appears in the above-identified patent and that said Letters Patent is hereby corrected as shown below:

In the Claims

Claim 2, Column 12, Line 54:
Before "parts of glycerol" insert --10--

Claim 2, Column 12, Line 55:
Before "parts to 15 parts of polytetrafluoroethylene" insert --5--

Signed and Sealed this
Twenty-second Day of July, 2025

Coke Morgan Stewart
*Acting Director of the United States Patent and Trademark Office*